United States Patent [19]

Day et al.

[11] 4,358,927

[45] Nov. 16, 1982

[54] PRESSURE OPERATED PROPORTIONAL AIR MANAGEMENT VALVE

[75] Inventors: Edward G. Day; Gordon R. Paddock; Edward H. Seidewand, all of Rochester, N.Y.

[73] Assignee: General Motors Corporation, Detroit, Mich.

[21] Appl. No.: 211,068

[22] Filed: Jan. 22, 1981

[51] Int. Cl.³ .............................................. F01N 3/22
[52] U.S. Cl. ....................................... 60/290; 60/306
[58] Field of Search ................... 60/289, 290, 301, 306

[56] References Cited

U.S. PATENT DOCUMENTS

| | | | |
|---|---|---|---|
| 3,919,842 | 11/1975 | Bolton | 60/289 |
| 3,924,409 | 12/1975 | Heilman | 60/306 |
| 3,945,205 | 3/1976 | Atago | 60/289 |
| 4,192,141 | 3/1980 | Nonoyama | 60/290 |

Primary Examiner—Douglas Hart
Attorney, Agent, or Firm—Arthur N. Krein

[57] ABSTRACT

An air management valve in the exhaust emission control system for the engine of an automotive vehicle is operative to selectively control secondary air flow to the exhaust manifold next adjacent to the exhaust ports of the engine, to the center of a dual bed catalytic converter and to the atmosphere. The air management valve, adapted to be connected to an engine driven air pump, includes three air pressure operated valves, that is, a port air control valve controlling air flow to the exhaust ports, a proportional air control valve controlling divert air flow to the atmosphere and a pressure relief valve for the pressure relief divert air flow to the atmosphere, a flow control orifice controlling air flow to the converter, a port air control and a solenoid valve arranged to control pressure on one side of the port air control valve, a proportion air control solenoid valve arranged so as to control the flow of exhaust gases to one side of the proportional air control valve whereby to effect operation of this valve as a proportional regulator so as to maintain a constant pressure ratio between air pump pressure and exhaust pressure at the center of the converter.

3 Claims, 2 Drawing Figures

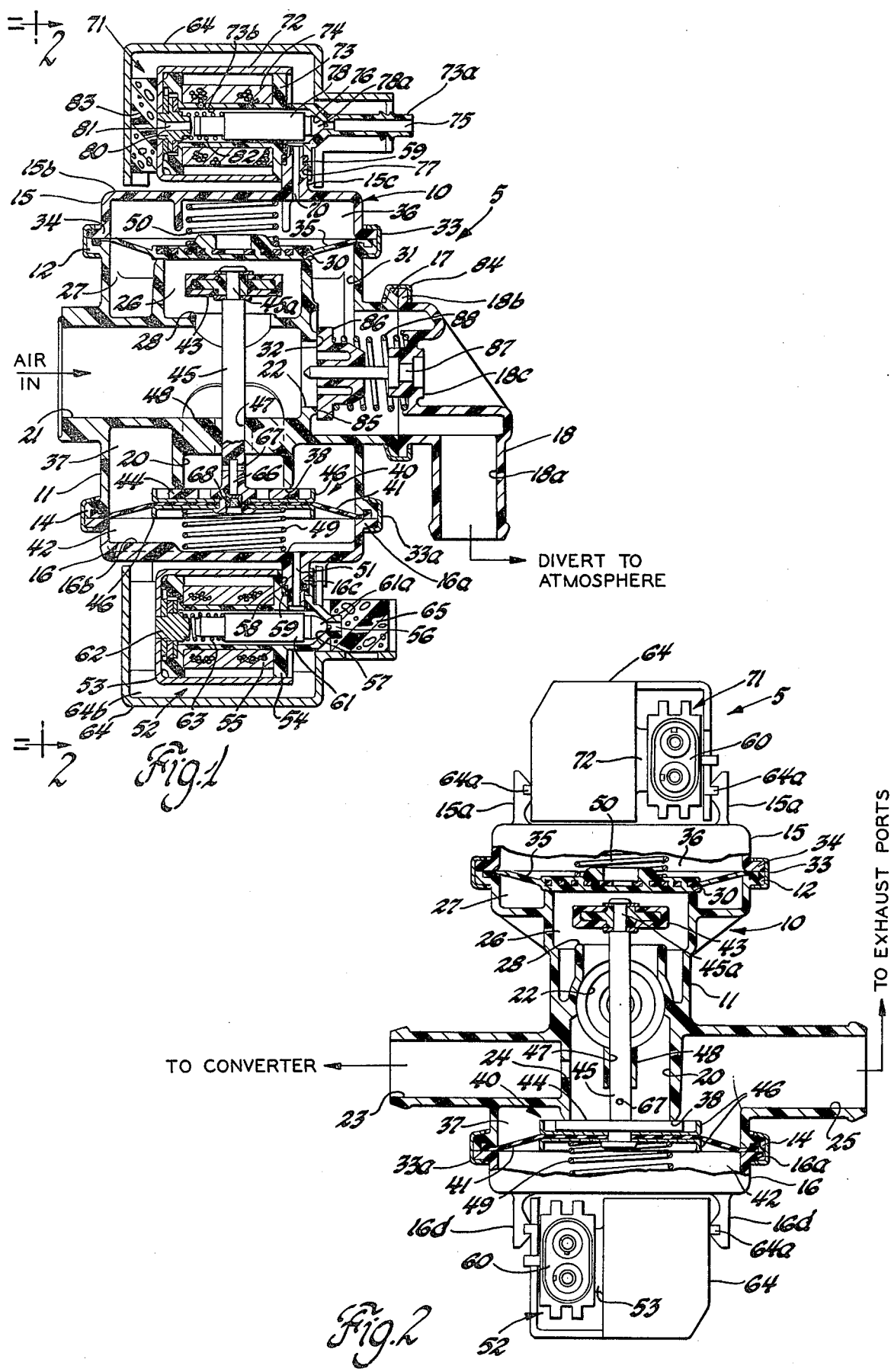

PRESSURE OPERATED PROPORTIONAL AIR MANAGEMENT VALVE

FIELD OF THE INVENTION

This invention relates to an air flow control valve for use in an exhaust emission control system for an internal combustion engine that is operative to deliver secondary air from an air pump to the exhaust system of the engine and, in particular to a pressure operated proportional air management valve for such a system.

DESCRIPTION OF THE PRIOR ART

One type of known exhaust emission control system for an internal combustion engine, as disclosed, for example, in U.S. Pat. No. 3,919,842 entitled Controller for Proportional Control of Reducing Converter Air issued Nov. 18, 1975 to Robert A. Bolton, includes an air induction device for introducing secondary air into the exhaust system selectively at a location ahead of a catalytic converter, such as into the exhaust manifold at a location next adjacent to the exhaust ports and into the catalytic converter of the system.

As is known in the art, the catalytic converter may be a dual type converter having one bed which will effect conversion of the carbon monoxide and hydrocarbon and the other bed for the reduction of oxide of nitrogen. In such dual bed converter arrangements, the beds may be arranged in separate canisters or in a single canister and may be arranged to have the exhaust gases passed serially therethrough. In addition, means may be provided to introduce secondary air upstream of the two beds and also between the two beds, that is, at a location between the two beds of the dual bed converter.

Various air control valve arrangements, with one or more valves incorporated therein, have been proposed to control the flow of secondary air ahead of the first bed of the converter and to control the flow of air to the second bed of the converter, the control of these air flows being effected by one or more of these valves which are responsive to engine or exhaust temperatures and also to engine vacuum. As well known, the secondary air introduced into the region ahead of the converter is preferably introduced into the exhaust manifold at a location closely adjacent to the exhaust ports of the engine.

SUMMARY OF THE INVENTION

It is therefore a primary object of this invention to provide an improved air management valve for use in an exhaust emission control system of an engine for controlling the delivery of secondary air from an air pump, as a function of air pump pressure and engine exhaust pressure, to either the exhaust manifold of the engine, to the center of a dual bed catalytic converter in the exhaust system downstream of the exhaust manifold or, to the atmosphere.

Another object of this invention is to provide a pressure operated proportional air management valve for use in the exhaust emission control system of an internal combustion engine that is operative to direct secondary air to the exhaust manifold during certain modes of engine operation, to the atmosphere during the power mode operation and deceleration of the engine and, to the center of a dual bed converter as a function of engine exhaust pressure.

The present invention provides an air management valve that is air pressure operated and is arranged so that when the associated engine is operated in a closed mode of operation, air flow to the center of a dual bed catalytic converter during closed loop operation of the engine will be proportional to exhaust flow thereto. In the preferred form herein disclosed, the air management valve, adapted to be connected to an engine driven pump includes three air pressure operated valves, that is, a port air control valve controlling air flow to the exhaust ports of an engine, a proportional air control valve controlling divert air flow to the atmosphere and a pressure relief valve for the pressure relief divert flow of air to the atmosphere, a flow control orifice controlling air flow to the center of a dual bed converter. A solenoid valve is arranged to control the flow of exhaust pressure to one side of the proportional air control valve whereby to effect operation of this valve as a proportional regulator whereby to maintain a constant pressure ratio between air pump pressure and exhaust pressure at the converter. When this ratio is the same as the pressure ratio from the engine exhaust manifold to the center of the dual bed converter, the air flow through the flow control orifice will be proportional to exhaust air flow.

For a better understanding of the invention as well as other objects and further features thereof, reference is had to the following detailed description of the invention to be read in connection with the accompanying drawings.

DESCRIPTION OF THE DRAWINGS

FIG. 1 is a longitudinal, cross sectional side view of a preferred embodiment of a pressure operated proportional air management valve constructed in accordance with the invention, the armature valves and relief valve guide thereof being shown in elevation; and, FIG. 2 is a side view of the subject air management valve taken in the direction of lines 2—2 of FIG. 1, with parts broken away to show various internal components of the valve assembly.

DESCRIPTION OF THE PREFERRED EMBODIMENT

The pressure operated proportional air management valve, generally designated 5, in the construction shown in FIGS. 1 and 2, includes a multiple piece valve housing 10, having as major elements thereof, a main body 11 provided with upper and lower flanges 12 and 14, respectively, and cup-shaped upper and lower covers 15 and 16, respectively, suitably secured together in a manner to be described hereinafter. Body 11 also includes a side flange 17 to which a discharge fitting 18, having an air divert passage 18a extending therethrough, is suitably secured in a manner to be described hereinafter.

Body 11 is formed with a center stepped opening, which with reference to the drawing, extends vertically upward from the lower portion thereof to provide a central valve chamber in the form of a passage 20 of a predetermined larger diameter at its lower end than at its upper end for a purpose to be described hereinafter.

Body 11 is also provided with a lateral inlet passage 21 which at its outboard end is adapted to be connected by a suitable conduit to a conventional engine driven air pump, both not shown. This inlet passage 21 at its other end opens into the passage 20 in co-axial alignment with a stepped diameter relief air discharge passage 22 in flow communication with the divert passage 18a in discharge fitting 18.

In addition, body 11 is provided with lateral extending passages on opposite sides thereof one of which, as best seen in FIG. 2, is a converter passage 23 with a flow orifice 24 of a predetermined diameter therein that opens at one end from the passage 20 and at its other end is connectable by a suitable conduit, not shown, to a converter, preferably, at a location between the beds of a dual bed converter in the exhaust system for an engine, not shown. The other passage is a port passage 25, to be described in greater detail hereinafter, which is adapted to be connected by a suitable conduit to the exhaust manifold of an engine, both not shown. Preferably, this secondary air discharged from this port passage 25 is introduced into the engine exhaust manifold at a location closely adjacent to the exhaust ports, not shown, of the engine.

As illustrated, the upper portion of body 11 defines a stepped cylindrical, open upper base terminating at flange 12 and which is so arranged whereby to provide a lower compartment 26 and an upper compartment 27. The lower compartment 26 is provided with an upstanding annular valve seat 28 therein with the upper reduced diameter end of passage 20 extending therethrough. The upper compartment 27 is also provided with an upstanding annular valve seat 30 therein with the upper end of the lower compartment 26 extending therethrough. In addition, and as best seen in FIG. 1, upper compartment 27 is interconnected by a side divert passage 31 in body 11 to the discharge passage 22 intermediate the ends thereof and downstream of the annular valve seat 32 therein in terms of the direction of air flow through the passage 22.

The upper cover 15 is secured to the body 11 as by means of a band clamp 33 encircling flange 12 of body 11 and the flange 34 of upper cover 15, with the outer peripheral edge of a flexible divert diaphragm valve 35 sandwiched therebetween. The diaphragm valve 35 thus defines a control chamber 36 with the upper cover 15 and separates this control chamber 36 from the upper compartment 27.

In addition, the lower portion of body 11 defines a cylindrical open base terminating at flange 14 which is constructed so as to provide a compartment 37 having a depending annular valve seat 38 therein, with the lower larger diameter end of passage 20 extending therethrough. As best seen in FIG. 2, this compartment 37 is in fluid communication with the inboard end of the port passage 25. The lower cover 16 is secured to the body 11 as by means of a band clamp 33a encircling the flange 14 of body 11 and the flange 16a of lower cover 16, with the outer peripheral edge of the flexible diaphragm 41 of a port air control, diaphragm valve means 40 sandwiched therebetween. The diaphragm 41 together with the other elements of the valve means 40, to be described in detail hereinafter, is thus operative to define a pressure chamber 42 with the lower cover 16 and to separate this chamber 42 from the compartment 37.

Flow through the passage 20 into either the chamber 37 at the lower end of body 11 or into the chamber 26 at the upper end thereof is controlled by a port air control, diaphragm valve means 40 and a valve 43, respectively. Although the diaphragm valve means 40 may be formed integral with the diaphragm 41, in the construction shown, this diaphragm valve means includes a valve 44 with a stem 45 extending therefrom that is operatively fixed to the diaphragm 41 for movement therewith.

In the construction illustrated, the valve 44 is positioned so as to have one side thereof abut against the top surface of the upper one of a pair of diaphragm supports 46 between which the central portion of the diaphragm 41 is sandwiched. These elements are suitably secured together as by having the lower end of the valve stem 45 extend through central apertures provided for this purpose in the diaphragm 41 and the supports 46, the free end of this valve stem portion then being staked over to effect unit assembly to the valve 44. The valve 44 as thus supported is positioned so that the upper surface thereof is adapted to be moved into and out of seating engagement with the valve seat 38.

The valve stem 45 is axially slidably guided in a guide bore 47 provided in the central enlarged portion of the spoke rib 48 that extends radially across a portion of the passage 20 in body 11. The valve 43 is suitably fixed to the opposite, reduced diameter end 45a of the valve stem 45 whereby this valve 43 is positioned for movement into and out of engagement with the valve seat 28. As illustrated, the axial distance between the valves 43 and 44 is preselected so that when the valve 44 is seated against the valve seat 38, the position shown, valve 43 is in an unseated relationship with its associated valve seat 28 and, then, when this valve 43 is seated against the valve seat 28, the valve 44 is in an unseated position relative to its associated valve seat 38.

Valve 44, as shown, is normally biased into seated engagement with the valve seat 38, with the valve 43 then being out of seating engagement relative to its valve seat 28, by means of a coil spring 49 that is positioned in the pressure chamber 42. As thus located, one end of spring 49 is in abutment against the base 16b of lower cover 16 and its opposite end is in abutment against the lower diaphragm support 46.

The force of this spring 49 is preselected relative to the initial effective working area of the valves 44 and 43, as defined by the different cross sectional flow areas at lower and upper ends of the stepped passage 20, subjected to the air pump discharge pressure during engine operation, so that when this air pressure reaches a predetermined value and when the pressure chamber 42 is vented to the atmosphere, in a manner to be described in detail hereinafter, the valve 44 will be forced, to a fully open position relative to the valve seat 38. As this occurs valve 43 will then be forced into seating engagement with its associated valve seat 28.

As shown, the diaphragm valve 35 is normally biased into seating engagement with valve seat 30 by means of a coil spring 50. The force of spring 50 is preselected relative to the force of spring 49 so that when a solenoid valve 52, to be described, is energized whereby the pressure chamber 42 is vented to the atmosphere, the force, that is, secondary air pressure, required to effect unseating of the diaphragm valve 35 from its valve seat 30 against the bias of spring 50 is greater than that required to effect unseating of the diaphragm valve means 40 from its associated valve seat 38 against the bias of spring 49 so that the latter thus defines the path of least resistance for the flow of secondary air.

To permit the above-described opening movement of the valve 44, pressure chamber 42 is adapted to be selectively placed in communication with the atmosphere as a function of the mode of engine operation in a manner to be described. For this purpose and as best seen in FIG. 1, the base 16b of lower cover 16 is provided with a depending boss 16c having a vent passage 51 that extends therethrough so as to open at one end thereof from the pressure chamber. Flow through this vent passage 51 to the atmosphere is controlled by a normally closed, port air control solenoid valve, generally designated 52.

The solenoid valve 52, in the construction shown as best seen in FIG. 1, includes a housing 53 supporting a tubular bobbin 54 which in turn supports a solenoid coil 55. As shown, the bobbin 54 is provided with an axial stepped bore therethrough which defines at one end thereof a discharge port 56 with an annular valve seat 57 encircling one end thereof.

Bobbin 54 is also provided with a stepped opening 58 that extends radially outward from next adjacent to the valve seat 57. Opening 58 is thus adapted to receive the boss 16c of lower cover 16 therein, a suitable seal, such as O-ring seal 59 effecting a fluid seal between the exterior of boss 16c and the internal peripheral surface of opening 58 in bobbin 54.

Solenoid coil 55 is adapted to be connected by suitable electrical connector via its terminal 60, as shown in FIG. 2, to a source of electrical power, controlled, for example by a known electronic control module or on-board electronic computer, not shown, which is adapted to receive control signals indicative of engine operating conditions in a known manner and which would be operative so as to only energize the solenoid coil 55 when the engine is operating in an open loop mode of operation.

A cylindrical armature 61 is slidably received in the bore of bobbin 54 and is provided with a valve 61a at one end thereof for seating engagement with the valve seat 57. A solenoid pole piece 62 is fixed to the housing 53 in position to control movement of the armature 61. A coil spring 63 is positioned to normally bias the armature 61 in an axial direction whereby the valve 61a portion thereof is in seating engagement with the valve seat 57. As shown, the armature 61 is thus able to move between a closed position with respect to the valve seat 57 and, upon energization of the solenoid coil 55, to a position at which the valve end 61a is unseated from the valve seat 57 to allow flow from the pressure chamber 42 out through the vent passage 51 and discharge port 56 to the atmosphere. In this manner, the pressure in pressure chamber 42 will, in effect, be substantially atmospheric pressure when solenoid valve 52 is energized.

In the particular construction shown, the solenoid valve 52 is suitably secured to the lower cover 16 as by being supported thereagainst by means of a cover 64 that is suitably fixed to the lower cover 16 so as to partly enclose the solenoid valve 52 in a manner whereby to permit ambient air to flow thereabout. For this purpose, in the construction illustrated, the cover 64 is provided with outturned side flanges 64a snapped into the notched depending support arms 16d of the lower cover 16. In addition cover 64 is provided with suitable internal ribs, only the rib 64b being shown in FIG. 1, which align and support the housing 53 of solenoid valve 52 within the cover 64. In addition, as best seen in FIG. 1, a filter 65, such as a polyurethane foam filter is positioned about the outboard end of the discharge port 56 of the solenoid valve 52.

For a purpose to be described in detail hereinafter, the valve stem 45, as best seen in FIG. 1, is provided with a flow control passage that includes a flow passage 66 that extends axially upward from the lower portion thereof up to a location above the valve 44, so as to be in flow communication with radial side ports 67, of predetermined diameter, for the controlled flow of fluid therethrough. In addition, a flow restrictor 68, for example in the form of an inverted cup-shaped plug with an orifice passage therethrough, is positioned in the enlarged diameter end of the passage 66.

The above described flow control passage is used to interconnect the pressure chamber 42 to the passage 20 whereby air at discharge pump pressure from the passage 20 can flow at a controlled rate into the pressure chamber 42. The effective cross sectional flow area as defined, for example in the construction shown, by the flow restrictor 68 should be such that the rate of air flow therethrough is substantially less than that which can flow through the vent passage 51 and discharge port 56 when the solenoid valve 52 is energized.

Thus when the solenoid valve 52 is energized a differential pressure can develop across the diaphragm valve means 40 whereby to effect its unseating against the bias of spring 42 during that period of time when the solenoid valve 52 is energized. However, when the solenoid valve 52 is de-energized, flow through the vent passage is then blocked so that air then flowing through the above-identified flow control passage from the passage 20 into the pressure chamber 42 acting against one side of the diaphragm valve means 40 will assist the spring 49 to effect seating engagement of the valve 44 against its associated valve seat 38, the position shown in the drawings.

Control chamber 36 on the upper side of the diaphragm valve 35, in a manner somewhat similar to the arrangement just described with reference to pressure chamber 42, is adapted to be selectively placed in communication with either the atmosphere or to a source of engine exhaust pressure, in a manner to be described, during preselected modes of engine operation as described in detail hereinafter.

For this purpose and again referring to FIG. 1, the base 15b of upper cover 15 is provided with an upstanding boss 15c having a passage 70 extending therethrough with one end thereof thus opening into the control chamber 36. Flow through this passage 70 to either the atmosphere or its connection to exhaust pressure is controlled by a normally closed, proportional air control solenoid valve, generally designated 71, so constructed that the passage 70 is normally in communication with the atmosphere in a manner to be described hereinafter.

In the construction illustrated in FIG. 1, the solenoid valve 71 includes a housing 72 which supports a tubular bobbin 73 supporting a solenoid coil 74. As shown, the bobbin 73 includes at one end thereof a fitting portion 73a and is provided with an axial stepped bore 73b therethrough which defines at the fitting end thereof a support passage 75 that is adapted to be connected, as by a conduit, not shown, to the exhaust system of the engine, for example, at a location directly upstream of the second bed of the catalytic converter, not shown. Alternately, as will now be apparent to those skilled in the art, the fitting 73a can be connected by a conduit, not shown, to the converter passage 23 at a location outboard of the flow orifice 24.

Bobbin 73 is provided with an annular valve seat 76 encircling an inboard portion of the port passage 75. Bobbin 73 is also provided with a stepped opening 77 which extends radially outward from the stepped bore 73b at a location next adjacent to the valve seat 76.

Opening 77 is adapted to receive the boss 15c of the upper cover 15 therein with a suitable seal, such as an O-ring seal 59, to effect a fluid seal between the exterior of boss 15c and the inner peripheral surface of the bobbin 73 defining opening 77.

Solenoid coil 74 is adapted to be connected by a suitable electrical connector via its terminal 60, shown in FIG. 2, in a manner similar to the coil 55 of solenoid valve 52, to a source of electrical power, as controlled, for example by an on-board electronic computer, not shown. As is well known, this type computer is adapted to receive control signals indicative of engine operating conditions, in a known manner. It is not deemed necessary to describe such an on-board electronic computer since it forms no part of the subject invention and a description thereof is not deemed necessary for an understanding of the invention.

However it should be noted that in a preferred method of operation, the computer would be programmed so as to energize only the solenoid valve 52 during open loop mode of engine operation, only the solenoid valve 71 during closed loop mode of engine operation. During deceleration and the power mode of engine operation, both solenoid valves 52 and 71 would be de-energized, all for the purpose of permitting the air management valve 5 to operate in a manner to be described in detail hereinafter.

A cylindrical armature 78 is slidably received in the bore 73b of bobbin 73 and this armature is provided with a valve 78a at one end thereof for seating engagement with the valve seat 76. A solenoid pole piece 80 with an axial aperture 81 therethrough is fixed to the housing 72 in position to control axial movement of the armature 78. A coil spring 82 is positioned to normally bias the armature 78 in an axial direction whereby the valve 78a thereon is in seating engagement with the valve seat 76.

Thus as shown, when the solenoid coil 74 is not energized the armature 78 is adapted to move to a first position at which the valve 78a thereon seats against the valve seat 76 blocking flow through the passage 76 while permitting fluid communication between the axial aperture 81 and the passage 70. Upon energization of the solenoid coil 74, the armature 78 is adapted to move to a second position at which the valve end 78a is unseated from the valve seat 76 to allow flow through the passage 75, with the opposite end of armature then blocking flow through the passage 81, all for a purpose to be described in detail hereinafter.

Solenoid valve 71 is secured to the upper cover 15 by means of a second cover 64 secured to the support arms 15a of the upper cover in the same manner as previously described hereinabove with regard to the support of solenoid valve 52 by its cover 64 to lower cover 16. As best seen in FIG. 1, a filter 83, for example a polyurethane foam filter, is suitably positioned at the outboard end of the axial aperture 81, for example as by being suitably bonded by an adhesive, not shown, to the housing 72.

Referring now to the discharge fitting 18, it is secured to the main body 11 with its divert passage 18a in flow communication with the air relief discharge passage 22 by means of a band clamp 84 encircling the side flange 17 of the main body 11 and the flange 18b at one end of the discharge fitting 18. The opposite end of the divert passage 18a in fitting 18 is placed in flow communication with the atmosphere as by having this fitting connected by a suitable conduit, not shown, to the dirty side of the air cleaner for an engine, both not shown.

A valve seat 85 is formed about the discharge passage 22 in position so as to be engaged by a valve member 86. Valve member 86 is adapted to slide on a shaft 87 which is suitably fixed at one end to a turned-in, boss-like portion 18c of the discharge fitting 18.

A spring 88 biases the valve member 86 against the valve seat 85 until the pressure in the passage 20 rises above a preselected level. At this preselected pressure level valve member 86 is displaced in an opening direction relative to the valve seat 85 whereby a portion of the secondary air flowing through the passage 20, as supplied by an air pump, not shown, is diverted through the discharge passage 22 and through the divert passage 18a in the discharge fitting 18 for discharge to the atmosphere.

OPERATION

In various present day vehicles, the engine is operated in either an open loop mode of operation during certain phases of engine operation or, in a closed loop made during other phases of operation, as controlled by an on-board electronic computer, previously described. The on-board electronic computer is adapted to receive various signals, in a known manner, indicative of engine operating conditions and, in addition during the closed loop mode, a signal from an oxygen sensor in the exhaust system of the engine. With this arrangement, during the open loop mode of operation the engine is operated in a normal manner with the standard air fuel ratio for various phases of engine operation. During the closed loop mode the engine is operated with the standard air fuel ratio and, in addition, the oxygen sensor in the exhaust system feeds back a signal of the actual air fuel ratio as an added input to the computer for use in maintaining a substantially constant air fuel ratio supply to the engine.

During engine operation, the air pump, not shown, will be continuously operated so as to supply secondary air to the central passage 20 of the air management valve 5 via the inlet passage 20, with the output of the air pump to this valve being related to engine speed.

The secondary air thus delivered to the air management valve may leave it in any one of four possible routes. These routes are: (1) past the diaphragm valve means 40 valve seat 38 combination out through the port outlet passage 25 "To Ports"; (2) past the diaphragm valve 35 valve seat 30 combination and out through the side passage 31 and the divert passage 18c, as divert air discharge to the atmosphere "Divert Air"; (3) past the pressure relief valve member 86 and via the divert passage 18c, as divert air discharged to the atmosphere "Divert Air"; and, (4) through the flow orifice 24 and converter outlet passage 23 for discharge to the converter, not shown, "To Converter".

AIR TO PORTS

In order for the secondary air to flow out through the port outlet passage 25, the port air control solenoid valve 52 must be energized, that is during the open loop mode of operation, whereby to vent the pressure chamber 42 on one side of the diaphragm 41 so that the diaphragm valve means 40 with its valve 44 will move away from the valve seat 38 to allow secondary air to flow into the compartment 37 and then out through the port outlet passage 25. The force required to push this diaphragm valve means 40 with its valve 44 away from the valve seat 38 must be less than that applied against the valve 43 and also against the diaphragm valve 35 and its spring 50 in order for this to be the path of least resistance. This, in effect, is a calibration requisite as previously described hereinabove.

As will be apparent when the port air control solenoid valve 52 is then de-energized, flow through the discharge port 56, used to vent the pressure chamber 42, will be closed and, as this occurs, secondary air from the passage 20 via the control flow passage, defined by the passage 66, side ports 67 and flow restrictor 68 in valve stem 45, will flow at a control rate into the pressure chamber 42 to thus effect substantial equalization of the pressure differential across the diaphragm valve means 40, thus allowing the spring 49 to effect seating of the valve 44 against its valve seat 38 whereby to close off the air flow to the port outlet passage 25. During this port mode of operation of the air management valve 5, a small amount of secondary air will also flow to the converter, not shown, via the flow orifice 24 and converter outlet passage 23, since this passage arrangement is at all times in flow communication with the passage 20.

DIVERT AIR
(Deceleration, and Power Mode)

Divert air flow to the atmosphere is accomplished when both the air control solenoid valve 52 and the proportional air control solenoid valve 71 are de-energized as controlled by the on-board electronic computer, not shown, during deceleration and power mode of engine operation. As described, the control chamber 37 on the upper side of the diaphragm valve 35 is vented to the atmosphere when the proportional air control solenoid valve 71 is de-energized. Thus the secondary air in the passage 20 can then flow past the now unseated valve 43 to push against the opposite or lower side of the diaphragm 35, against the force of spring 50, to effect unseating of the diaphragm valve 35 so that secondary air can then be bypassed via the side divert passage 31 and divert passage 18a to the atmosphere. During a deceleration divert, most of the secondary air will thus be bypassed, however a small portion of this secondary air flowing into the passage 20 can also flow out through the flow orifice 24 and converter passage 23 to the converter. However, on a power mode divert, all of the secondary air will be bypassed to the atmosphere since at that time the high exhaust pressure then present in the converter, not shown, will not allow air flow from the passage 20 out through the flow orifice 24. Preferably, a check valve, not shown, positioned in the conduit, not shown, connecting converter passage 23 to the converter is used to prevent the back flow of exhaust gases into passage 20.

PROPORTIONAL AIR

As previously described the flow orifice 24 in the converter passage 23 is in continuous flow communication with passage 20 and thus is operative to permit secondary air flow to the converter, not shown, whenever the air pump pressure is greater than the exhaust pressure at the center of the dual bed converter, not shown. This air flow to the converter, not shown, is made proportional to exhaust flow when the proportional air control solenoid valve 71 is energized in order to vent converter exhaust pressure to the control chamber 36 acting against the upper side of the diaphragm valve 35. When this occurs, the diaphragm valve 35 is then operative as a proportional regulator (bypass type) to maintain a constant pressure ratio between the air pump pressure and exhaust pressure at the second bed of the converter. When this ratio is made the same as the pressure ratio from the exhaust manifold to the center of the dual bed converter, both not shown, the secondary air flow through the flow orifice 24 in the subject valve will be proportional to exhaust flow.

PRESSURE RELIEF

The pressure relief is accomplished at anytime the secondary air pressure in passage 20, and thus in passage 22, is sufficient to effect unseating of the valve member 86 against the bias of spring 88.

Logic Table—The following table summarizes the preferred modes of operation of the subject air management valve 5.

| | SOLENOID STATES | | AIR FLOW | | |
| --- | --- | --- | --- | --- | --- |
| | PORT AIR CONTROL | PROPORTIONAL | | | |
| OPERATING MODE | SOLENOID VALVE | AIR SOLENOID VALVE | TO PORTS | TO CONVERTER | TO DIVERT |
| Open Loop | ON | OFF | YES | YES | NO* |
| Closed Loop | OFF | ON | NO | YES PROPORTIONAL | YES |
| Decel Divert | OFF | OFF | NO | YES | YES |
| Power Mode Divert | OFF | OFF | NO | NO** | YES |

*At high operating pressures some air may be diverted past the pressure relief valve.
**Provided converter pressure is greater than pump pressure.

In accordance with the above-described preferred mode of operation of the subject air management valve 5, this valve is operative whereby to control the flow of secondary air to the exhaust ports of the engine and to a converter, not shown, in a manner whereby to improve the pollutant conversion efficiency of the converter.

The embodiments of the invention in which an exclusive property or privilege is claimed are defined as follows:

1. An air pump pressure operated, proportional air management valve for controlling the selective delivery of air from an engine driven air pump either to the exhaust ports of an engine, to the center of a dual bed converter in the engine exhaust system, or to the atmosphere, said air management valve comprising: a housing means defining a passage means connectable at one end to the air pump, a converter passage with a flow orifice therein, a port passage, and a divert passage, each in flow communication at one end with said passage means and being connectable to the converter, to the exhaust ports of the engine and to the atmosphere, respectively, and an air relief passage, with a pressure relief valve therein, in flow communication at one end with said passage means and at its other end with the atmosphere; a port air control diaphragm valve means operatively associated with said passage means for movement between an open position and a closed position to control flow from said passage means to said port passage; a first spring means and a solenoid valve controlled atmospheric pressure chamber means operatively associated with one side of said port air control diaphragm valve means to normally bias it to said closed position and to control movement thereof to said open position; a valve means operatively connected to said port air control diaphragm valve means and operatively associated with said passage means whereby to block flow from said passage means to said divert passage means when said port air control diaphragm valve means is in said open position; a proportional air control diaphragm valve means operatively associated with said divert passage so as to operate between an open position and a closed position whereby to control flow through said divert passage; and, a second spring means and a solenoid valve controlled exhaust pressure chamber means connectable to the exhaust system with both operatively associated with one side of said proportional air control diaphragm valve means to normally bias it to said closed position and to control movement thereof to said open position as a function of engine exhaust pressure.

2. An air management valve for use with an engine having an exhaust emission control system including an engine driven air pump, an exhaust manifold connected to the engine and an exhaust conduit for receiving exhaust gases discharged from the engine and defining a flow path for passing the exhaust gases through a dual bed converter, said air management valve comprising: a housing means defining an inlet passage connectable to the air pump, a converter passage with flow orifice therein for the delivery of air to the center of the dual bed converter, a port passage for the delivery of air to the exhaust manifold, and a divert passage for delivery of air to the atmosphere, one end of each of said converter passage, said port passage and said divert passage being in flow communication with a valve chamber passage in said housing means that is in flow communication with said inlet passage, an air relief passage with a pressure relief valve therein in said housing means connected at one end to said valve chamber passage and opening at its other end to the atmosphere; a port air control diaphragm valve means operatively associated with said valve chamber passage and being operative between an open position and a closed position to control flow from said valve chamber passage to said port passage, a first spring means operatively positioned to normally bias said port air control diaphragm valve to said closed position, a port air control solenoid valve controlled atmospheric pressure chamber means operatively associated with one side of said port air control diaphragm valve to permit movement thereof to said open position as a function of air pump pressure; a valve means operatively connected to said port air control diaphragm valve means and operatively associated with said valve chamber passage to block flow from said valve chamber passage to said divert passage when said port air control diaphragm valve means is in said open position and to permit flow when it is in said closed position; a divert air control diaphragm valve means operatively associated with said divert passage and operative between an open position and a closed position to control flow through said divert passage, a second spring means operatively associated with said divert air control diaphragm valve means to normally bias it to said closed position; a pressure chamber means operatively associated with one side of said divert air control diaphragm valve, and a divert air control solenoid valve means connectable to the exhaust conduit and operable to place said pressure chamber means selectively in flow communication with engine exhaust pressure and the atmosphere.

3. An air pump pressure operated, proportional air management valve for selectively controlling the delivery of air from an engine driven air pump to the exhaust ports of an engine, to the converters in the engine exhaust system, or to the atmosphere, comprising: a housing means defining a passage in communication with an inlet passage connectable to the air pump, a flow port passage and a divert passage, each in flow communication with opposite ends of said passage being connectable to the engine exhaust ports and to the atmosphere, respectively, a converter passage with a flow orifice therein in communication with said passage intermediate the ends thereof and being connectable to the converter, an air relief passage, with a pressure relief valve, in said housing means and connected at one end to said passage and in flow communication at its other end with the atmosphere; an air pump pressure operated, port air control diaphragm valve means operatively associated with said passage and said port passage to control flow from said passage to said port passage said port air control valve means including a solenoid valve controlled atmospheric pressure chamber means operatively associated with one side of said port air control diaphragm valve to control movement thereof between first position blocking flow from said passage to said port passage and a second portion permitting flow, a proportional air control diaphragm valve means operatively associated with said passage and said divert passage to control flow from said passage to said divert passage and including solenoid valve controlled exhaust pressure chamber means operatively associated with one side of said proportional air control diaphragm valve means and connectable to the exhaust system whereby to apply exhaust pressure to one side of said proportional air control diaphragm valve so that it operates as a proportional regulator to maintain a constant pressure ratio between air pump pressure and exhaust pressure whereby air flow through said flow orifice to the converter will be proportional to exhaust flow.

* * * * *